(No Model.) 4 Sheets—Sheet 1.
W. N. WHITELEY & W. BAYLEY.
COMBINED HARVESTER AND BINDER.
No. 378,814. Patented Feb. 28, 1888.
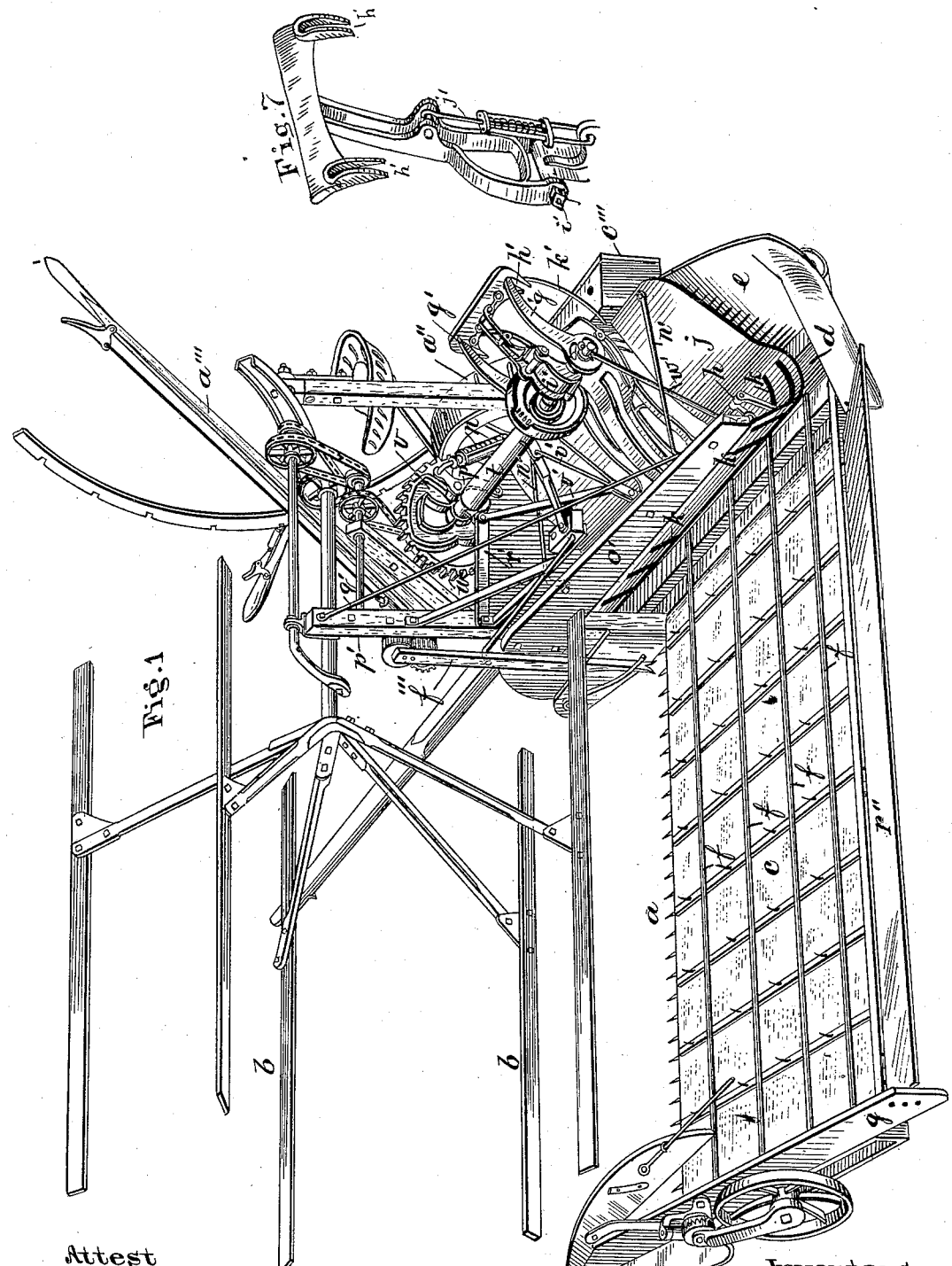

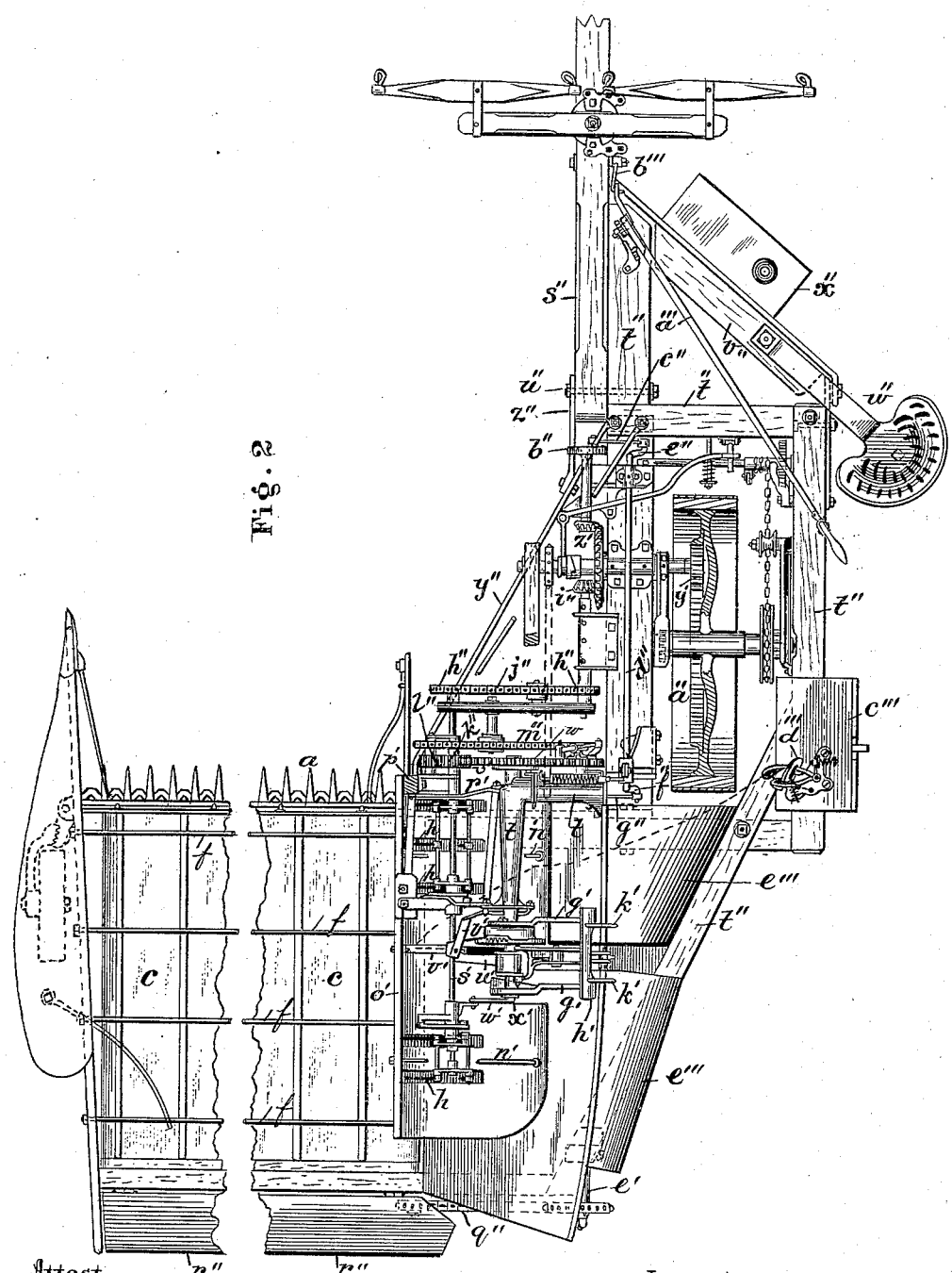

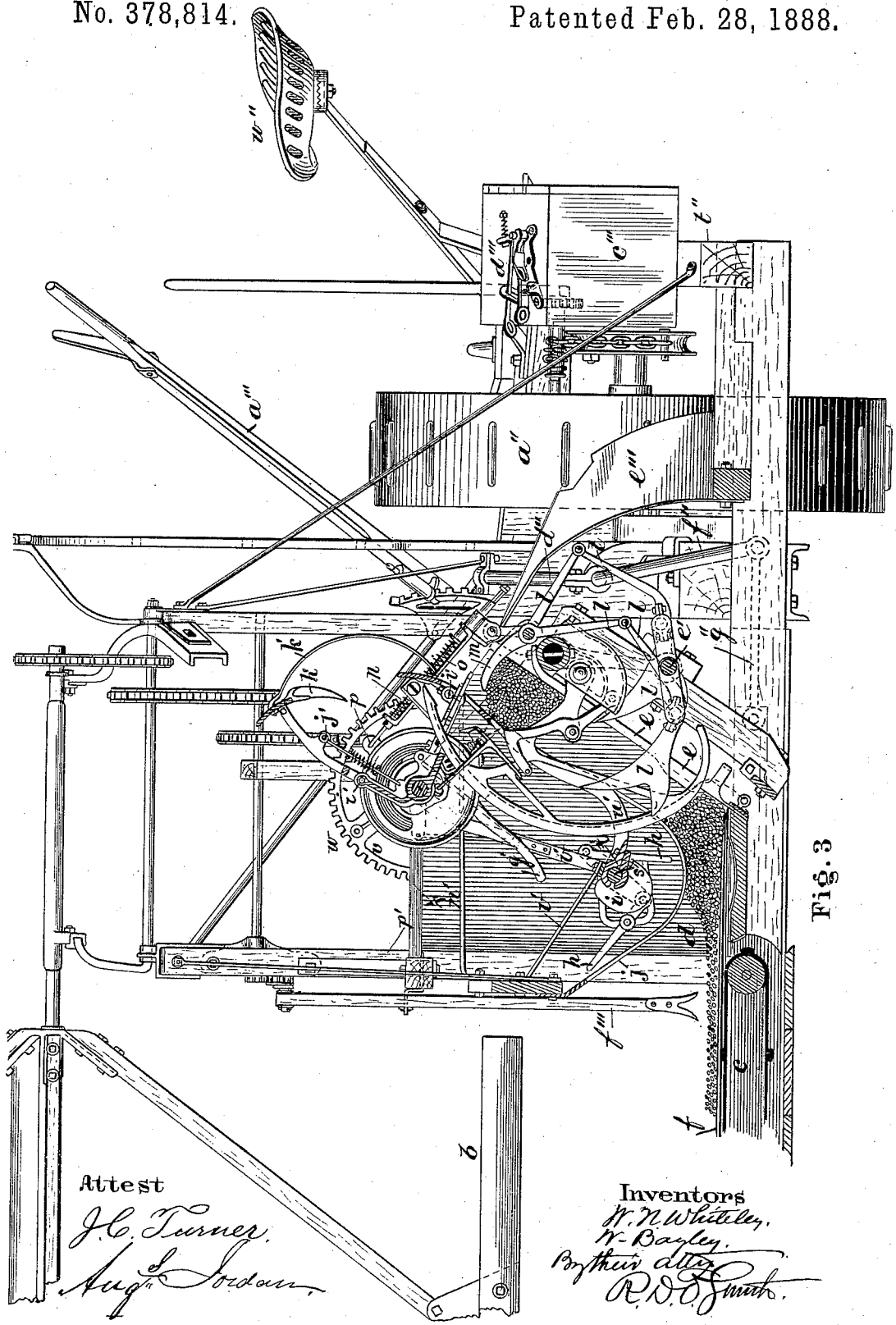

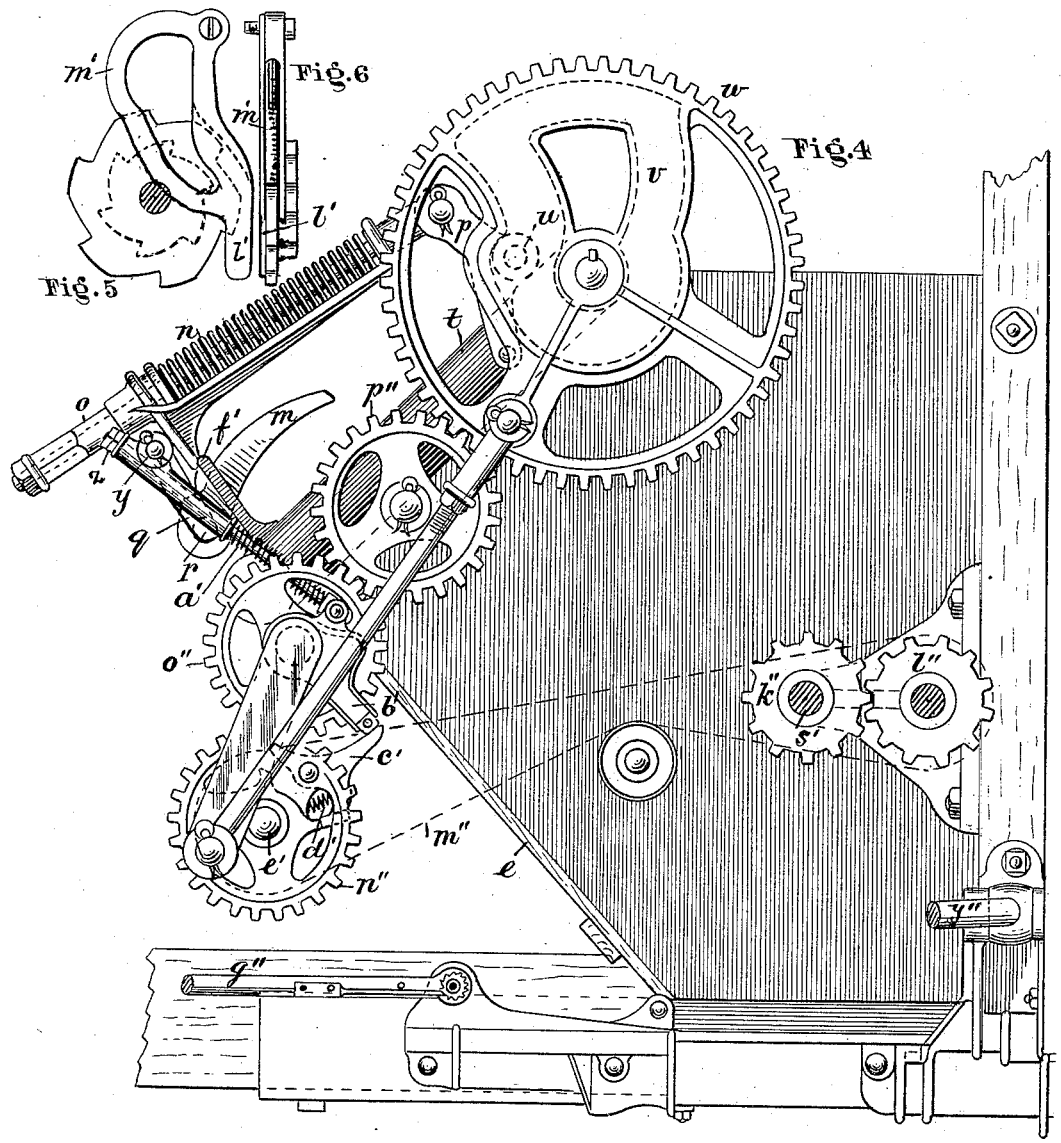

UNITED STATES PATENT OFFICE.

WILLIAM N. WHITELEY AND WILLIAM BAYLEY, OF SPRINGFIELD, OHIO.

COMBINED HARVESTER AND BINDER.

SPECIFICATION forming part of Letters Patent No. 378,814, dated February 28, 1888.

Application filed February 5, 1883. Serial No. 83,994. (No model.)

*To all whom it may concern:*

Be it known that we, WILLIAM N. WHITELEY and WILLIAM BAYLEY, of Springfield, in the county of Clark and State of Ohio, have invented certain new and useful Improvements in Combined Harvesting and Binding Machinery, of which the following is a specification.

In the accompanying drawings, Figure 1 is a perspective view of a self-binder embodying our improvements from the rear. Fig. 2 is a plan view of the same with the reel removed for purposes of perspicuity. Fig. 3 is a cross-sectional elevation viewed from the rear of the machine. In this view part of the platform-conveyer is broken away, so as to admit of the view being drawn to an enlarged scale. Fig. 4 is an elevation of the gear-wheels that actuate the binding mechanism, as seen from the front of the machine, and it is drawn to a still larger scale than Fig. 3, and the sprocket-wheels and chain for driving the initial packers are shown in dotted lines to avoid confusion. Figs. 5 and 6 are elevations of the cord-holding device. Fig. 7 is a perspective view of the elastic stripper.

The present invention relates to self-binders; and it consists in a rear-cut combined harvester and binder having the gearing that actuates said binder located at a point between the line of the axle of the master-wheel and the cutting apparatus for the purpose of balancing the machine, and at the same time permitting the bound sheaves to be delivered at the rear of the master-wheel.

It also consists in a binding-machine having its binding-table upwardly inclined, so as to form an obtuse angle with the upper surface of the platform-conveyer, so that it may serve as a supporting frame or base for any suitable combined elevating and packing mechanism, as well as a binding-table, whereby we obtain a proper separation of the bound from the unbound grain.

It also consists in a binding-machine having a binding-table arranged and located to serve, also, as a supporting frame or base for any suitable elevating device, whereby the sheaves, when bound, shall be sufficiently elevated to insure their proper delivery from the binding apparatus.

It also consists in a binding-machine provided with any suitable cutting and platform-conveying apparatus which will insure a proper delivery of the grain to an obtuse-angled upwardly-inclined binding-receptacle that is provided with two separate packing devices, one for the purpose of forwarding the grain over the horizontal portion of said grain-receptacle and the other to elevate it to a compressing device.

It also consists in a combined harvester and binder having a table upon which the grain is elevated as well as bound, also confined on all sides, except one, which will leave the heads of said grain free from pressure and not liable to double up and thrash while being elevated and bound.

It further consists in the construction and combinations of various devices for automatically binding grain.

To enable others skilled in the art to which our invention belongs to make and use the same, we will proceed to describe its construction and operation.

We do not deem it necessary or expedient to particularly describe such parts as are well known to those acquainted with the state of the art, and we shall therefore confine ourselves to a description of the parts hereinafter claimed and their connection with other parts wherever it becomes necessary so to do.

The grain is reeled to a cutting apparatus, $a$, by a reel, $b$. After the grain is cut it falls upon a platform-conveyer, $c$, which may be of any construction suitable to transfer the grain to a grain-receptacle, $d$, which is situated at the intersection of the platform-conveyer and the upwardly-inclined binding-table $e$. A space is necessarily left between the end of the platform-conveyer $c$ and grain-receptacle $d$ for the passage of the grain-slats if a canvas conveyer is used and for the passage of the rakes if a chain conveyer should be used. To bridge over the space thus left we employ rods, ropes, or hoop-irons $f$, which extend from the grain-board $g$ to the grain-receptacle $d$. The grain having been conveyed into the receptacle $d$ by any of the devices used for that purpose, a system of packers, $h$, which may be rotary or reciprocating, controlled by irregularly-shaped cams $i$, that cause said packers to protrude so as to act properly on the grain and then to retreat in almost a vertical direction, so as to withdraw from the grain without entanglement.

To confine the grain to the action of the packers, binding-arm, and compress, we employ a suspended cover, $j$, that is provided with slots $k$ to permit the packers $h$ to pass through while in action. These packers are used to transfer the grain from the aforesaid grain-receptacle into the range of travel of another system of packers, $l$, that will take the grain within their reach and compact it little by little into sheaf form against a yielding compress, $m$. This yielding compress is located at the top of the opening made by the suspended cover $j$ and inclined table $e$, and will confine the grain in the space made by the aforesaid cover and table until a sufficient amount shall have accumulated against said compress to form a sheaf of the desired size, at which time the compress will be forced to retreat by the pressure of grain and packers, and by its retreat move the coupling device that connects the harvesting machinery with that of the binder, which has been at rest awaiting the required accumulation of grain.

The mechanical arrangement of the present compress we believe to be new and an improvement over those now in use. For an enlarged view of this compress and coupling device see Figs. 3 and 4, in which the pitman $o$ is connected at one end to a bell-crank, $p$, and at the other to a crank, $q$, that is fast upon the oscillatory shaft $r$, to which the compress-finger $m$ is secured. This bell-crank $p$ is pivoted to the binder-frame $t$, and is provided with a friction-roller, $u$, that works in a cam-track, $v$, cast in the main drive-gear $w$, and through the agency of the aforesaid friction-roller, bell-crank, pitman, and cam-track the compress-finger is moved positively in one direction to permit the discharge of the bundle and in the opposite direction to arrest and hold the inflowing grain. The spring $n$ permits a backward movement of the compress independent of the pitman $o$ sufficient to cause the coupling device, to which the compress is connected, to be thrown into gear.

It will be seen by the drawings that we have illustrated our improvements, as far as they relate to the binding attachment, as applied to that type of self-binder known as the "Appleby binder," and the binder in its general features and as to such parts as are omitted from our drawings as not necessary to a thorough understanding of our invention will be found described in the specification of Letters Patent No. 212,420, granted to John F. Appleby, February 18, 1879.

In our improved compress and self-starter we secure the compress to the shaft $r$, as before mentioned, and the shaft $r$ is connected at $y$ with the yielding pitman $o$ by the crank-arm. To the crank-arm, at the pivot $y$, we secure a rod, $z$, provided with a spring, $a'$, that permits it to yield when the self-starting clutch $b'$ $c'$ $d'$ comes to a sudden stop against it. The customary dog for engaging with the pivoted spring-latch $c'$ when the binder is in action is not shown in the drawings, but should be secured to the packer-shaft $e'$ in a suitable manner to engage with said latch when the latch is released by the pawl $b'$ and thrown out by the action of the spring $d'$ into the path of the continuously-revolving dog.

When the binding mechanism comes to rest after the discharge of a sheaf, the spring-pitman $n$ $o$ stops against a projection, $f'$, that forms a part of the binder-frame $t$. With this construction and arrangement we are enabled to dispense with a number of parts heretofore thought to be necessary, and thereby greatly reduce the liability to derangement when in action.

The revolving ejectors $g'$, after discharging a bound sheaf, continue and complete a full revolution, and in doing so their extreme ends pass through forked strippers $h'$. These strippers are pivoted to the knotter-frame at $i'$, and they are provided with, preferably, a spring or elastic extensible connecting-rod, $j'$, that connects them to the aforesaid knotter-frame at a distance from the joint $i'$, and permits the strippers $h'$ to turn back on said joint $i'$ a distance sufficient to allow the ejectors to pass through them under a yielding pressure having sufficient force to strip the grain from them. The rods $k'$ are attached to the strippers $h'$ in the manner shown, and serve as an additional safety device to prevent the sheaf from following the ejectors after it should have left them.

To the customary cord-holder, clamp, or shoe $l'$ we supply a curved extension, $m'$, forming a loop on the side of said holder, through which the needle-arm passes. Said extension serves to confine the band-cord and cause it to fall into the proper notch in the disk and prevent said disk from being rotated forward by the strain of the cord during the time it is being drawn through the cord-holder to form the knot.

The shield $j$ is suspended through the agency of braces $n'$ and a projecting support, $o'$. The support $o'$ is fastened to the upright $p'$ by screw-bolts. A diagonal brace, $q'$, and a cross-bar, $r'$, that joins the upright $p'$ with the binder-frame $t$, also assists in its support.

The initial packer-shaft $s'$, that actuates the packers $h$, is supported about mid-length by a bearing, $t'$, formed in the end of the slotted bridge $u'$, and a brace, $w'$, that is secured to the hub of the cam that directs the course of travel of said packers and to the knotter-operating shaft $x'$. The bridge $u'$ is supported by the binder-frame $t$ through the agency of braces $v'$ and knotter-frame $i'$.

The sickle receives its reciprocating movement by means of a master-wheel, $a''$, an initial pinion, $y'$, bevel-gear $z'$, crank-wheel $b''$, pitman $c''$, shaft $d''$, having cranks $e''$ $f'''$, and pitman $g''$. The packers $h$ derive their motion from the bevel-gear $z'$ by means of a bevel-pinion, $i''$, sprocket-wheels $h''$, one of which is fast to the shaft of the pinion $i''$ and the other to the packer-shaft $s'$, and a chain, $j''$.

To drive the packers $l$, we employ spur-wheels $k''$ $l''$, a chain, $m'''$, and two sprocket-wheels, one of which is fast to the spur-wheel $l''$ and the other to the packer-shaft $e'$.

The binding mechanism is driven by the packer-shaft $e'$ by means of gear-wheels $n''$, $o''$, $p''$, and $w$.

It will be observed that the whole of the gearing above described and used to operate the harvesting and binding mechanism is located slightly in advance of the cutter-bar and in the rear of the axle of the master-wheel, which, with the aid of the weight of the operator applied in front of the axle of the master-wheel, enables us to suitably balance the machine and at the same time have the binding mechanism located in the rear of the axle of the aforesaid master-wheel, so as to obtain a rear discharge for the bound sheaves. The downwardly and rearwardly inclined chute or guide $e'''$ gives direction to the falling bundle as it is discharged from the binder-table $e$.

The conveyer $c$ is driven from the packer-shaft $e'$ by chain $q''$ and two sprocket-wheels, one of which is on the aforesaid shaft and the other on the inner roller of the conveyer mechanism. It will also be observed that the binding mechanism is so located in relation to the harvester that an uninterrupted passage is made for the heads of grain that may be longer than the machine, and we thereby obviate the difficulties arising from the doubling up of long grain where it is confined on all sides. In short grain we can raise the hinged wind-board $r''$ and keep the grain from spreading, and in long grain we can incline the wind-board and thereby form a wide bearing-surface for the straw.

The platform may be made adjustable vertically to clear inequalities of the ground by any suitable device, as may also the reel.

The binder may be adjustable upon the harvester to suit varying lengths of grain, or an intermediate butting device may be used to shift the grain over to a position suitable for binding.

The binding-table $e$ is covered with zinc to make it smooth and less liable to retard the upward progress of the grain.

The twine-box $c'''$ carries a tension device, $d'''$, through which the twine passes on its way to the binding-arm and cord-holder.

The clearer and adjuster $f''''$, situated at the intersection of the conveyer and binding-table, serves to clear the near end of the cutting apparatus from weeds and foreign matter, and it also serves to throw the grain over in a manner suitable for binding. We do not confine ourselves to this particular clearing and adjusting device, as a canvas butting device having a horizontal adjustment to shift short grain over to the most favorable place for binding may be found to answer fully as well.

It will be observed that the whole system of levers for adjusting the machine are within easy reach of the operator while occupying his seat.

Having thus described our invention, what we claim as new, and desire to secure by Letters Patent, is—

1. A rear-cut platform-binder provided with an upwardly-inclined table to which the grain is elevated and on which it is bound, an overhanging shield that with said table forms a confined passage-way for the grain, a cord-carrying arm on a shaft below said table, and a knotting device above said shield, a suitable sheaf-ejecting device, and a downwardly-inclined chute exterior to the table for the proper discharge of the bound sheaves.

2. A platform-binder having an upwardly-inclined table upon which the grain is elevated as well as bound, a system of packers for elevating and compacting the grain into sheaf form, a band-carrying arm and a knotting device, an inclined chute down which the grain, when bound, is discharged, and a compress device at or near the apex of the angle formed by the aforesaid table and chute.

3. A platform-binder having an upwardly-inclined table upon which the grain is elevated as well as bound, and a chute down which the bound sheaves are discharged, said table and chute forming an angle whose apex is at the summit of said table, in combination with the operating-shaft of a system of grain-accumulating packers and a shaft upon which the binding-arm oscillates, located in the angular space covered by said binding-table and chute and thereby secured against interruption by foreign matter.

4. A platform-binder having an upwardly-inclined table upon which the grain is elevated as well as bound, a chute down which the bound sheaves are discharged, said table and chute inclosing an angular space in which is located a system of grain-accumulating packers, a binding-arm and shaft, and a shaft upon which a compress device is oscillated or rotated, whereby said operating parts are shielded against the interruption of foreign matter.

5. The packer-actuating mechanism consisting of a bevel-gear, $z'$ $i''$, sprocket-wheels $h''$, and a chain, $j'''$, combined with the spur-wheels $k''$ $l''$, a chain, $m'''$, and two sprocket-wheels, one of which is fast to the shaft of the spur-wheel $l''$ and the other to the packer-shaft $e'$, substantially as and for the purpose specified.

6. The projection $f'$, forming a part of the binder-frame $t$, in combination with a spring-pitman, $n$ $o$, and an oscillatory compress-finger, $m$, as and for the purpose specified.

7. The projection $f'$, forming a part of the binder-frame $t$, in combination with a spring-pitman, $n$ $o$, oscillatory compress $m$, spring connecting-rod $z$ $a'$, and latch $b'$, substantially as and for the purpose specified.

WILLIAM N. WHITELEY.
WILLIAM BAYLEY.

Witnesses:
F. B. FURNISS,
SOL J. HOUCK.